Patented Jan. 26, 1954

2,667,471

UNITED STATES PATENT OFFICE 2,667,471

POLYMERIZATION OF BUTADIENE-1,3 COMPOUNDS

James S. Sweely, Swarthmore, Pa., assignor to Sun Oil Company, Philadelphia, Pa., a corporation of New Jersey No Drawing. Application November 4, 1950, Serial No. 194,194

8 Claims. (Cl. 260—83.7)

This invention relates to emulsion polymerization of butadiene-1,3 compounds and more particularly to emulsifying agents for use in such polymerization.

It is well known that butadiene-1,3 compounds and mixtures thereof with other monomers can be polymerized in aqueous emulsion to produce synthetic rubber latices which may be coagulated to yield synthetic rubber. Synthetic rubber-like materials have been prepared by polymerizing, in aqueous emulsion, butadiene-1,3, halogen derivatives thereof, or other substituted butadiene-1,3 compounds, or by interpolymerizing the above with other compounds containing a vinyl group such as styrene, acrylic acid esters, acrylic acid nitrile, vinyl chloride, etc.

Soaps of disproportionated rosin acids are commonly used emulsifying agents for polymerizations such as the above. The present invention contemplates the use in emulsion polymerization of other emulsifying agents, by the use of which a reduction is effected in the time required to obtain the desired degree of polymerization.

I have discovered that the polymerization of a butadiene-1,3 compound in the form of an aqueous emulsion proceeds more rapidly in the presence of alkali metal soaps of petroleum naphthenic acids having certain properties as hereinafter specified, than in the presence of soaps of disproportionated rosin acids.

Sodium naphthenate has been suggested previously as an emulsifying agent in emulsion polymerization of certain butadiene-1,3 compounds, but alkali metal naphthenates having the particular properties which are essential features of naphthenates used according to the present invention have not been previously disclosed for that use, nor have alkali metal naphthenates prepared by the method employed according to the present invention been previously disclosed as emulsifying agents in emulsion polymerization. Consequently, the prior art polymerizations with sodium naphthenate have not given satisfactorily short reaction times, and naphthenates have not been considered suitable emulsifying agents.

The present invention is based on the discovery that some naphthenates give more rapid polymerizations than do rosin soaps, whereas other naphthenates do not; and the present invention resides in the use of naphthenates giving more rapid polymerizations than rosin soaps, which naphthenates have been prepared, by treatment as hereinafter specified, from naphthenates which do not give more rapid polymerization than rosin soaps.

Petroleum naphthenic acids are mixtures of cycloaliphatic monocarboxylic acids which can be obtained in relatively concentrated form from crude petroleum by steps including saponifying a fraction of the petroleum to obtain a mixture comprising a major proportion of unsaponifiable material and a minor proportion of naphthenate soaps, effecting an at least partial separation between soaps and unsaponifiable material, and then acidifying the separated soaps to obtain naphthenic acids in relatively concentrated form.

In the case of kerosene naphthenic acids and gas oil naphthenic acids, each hereinafter referred to as light naphthenic acids, the acids can be obtained in relatively concentrated form by a series of steps including distilling the crude to obtain kerosene and/or gas oil distillate fractions containing small amounts of light naphthenic acids, caustic treating the distillate fractions, and acidifying the aqueous layer resulting from such treating, thus obtaining light naphthenic acids which are relatively concentrated, though still generally in admixture with a substantial proportion of unsaponifiable material, e. g. oil.

In the case of lubricating oil naphthenic acids, the acids can be obtained in relatively concentrated form by a series of steps including distilling the crude to obtain light distillate fractions, saponifying the distillation residue, vacuum distilling the saponified residue to obtain lubricating oil distillate fractions, and acidifying the vacuum distillation residue to obtain lubricating oil naphthenic acids which are relatively concentrated, though still generally in admixture with a major proportion of unsaponifiable material.

Other means for obtaining relatively concentrated naphthenic acids from crude petroleum can be used.

It has been found that relatively concentrated naphthenic acids obtained as described above are generally not suitable emulsifying agents for polymerizations of butadiene-1,3 compounds. Removal of unsaponifiable material from such relatively concentrated acids has been found to substantially improve the soaps of the acids as emulsifying agents in such polymerizations, but I have discovered that even complete removal of unsaponifiable material from relatively concentrated acids is in most cases not sufficient to render the acids suitable, i. e. equal to or superior to soaps of disproportionated rosin acids, for use in emulsion polymerizations of butadiene-1,3 compounds. Therefore the present invention involves using, in emulsion polymerization of butadiene-1,3 compounds, alkali metal soaps of petroleum naphthenic acids which have been obtained from crude petroleum in relatively concentrated form, reduced in unsaponifiable material content to a suitable degree as subsequently specified, and additionally treated to obtain certain properties as subsequently specified which are essential if the alkali metal soaps of the acids are to be superior emulsifying agents for use in the emulsion polymerization of butadiene-1,3 compounds.

The properties which must be obtained are as follows:

The unsaponifiable material content of the acids must be less than about ten weight percent, preferably less than five percent. Removal of unsaponifiable material from mixtures thereof with naphthenate soaps can be effected, for example, by contacting the mixture with a solvent, e. g. petroleum naphtha, for the unsaponifiable material, thereby to extract unsaponifiable material, leaving naphthenates as raffinate. Removal of unsaponifiable material from mixtures thereof with naphthenic acids can be effected, for example, by known solvent extraction methods; or, provided the acids are sufficiently more volatile on the average than the unsaponifiable material, the acids can be vaporized from mixtures with unsaponifiable material to obtain a distillate consisting of more highly concentrated acids.

Furthermore, the naphthenic acids used must be substantially free of constituents boiling above about 485° F. at 1 mm. Hg pressure. Removal of constituents boiling above the required maximum boiling point from naphthenic acids containing such constituents can be effected by any suitable means, e. g. distillation, for separation of acids according to molecular weight.

Furthermore, the naphthenic acids must have bromine number, as determined according to the method specified in A. S. T. M. Test 875–46T, less than about 6, and preferably about 0.3–2.0. Reduction of bromine number to the necessary degree can be effected for example by contacting the acids, in the presence of a catalyst such as mineral acid with formaldehyde, or with a material capable of liberating formaldehyde, at an elevated temperature, e. g. 200–300° F. In such treatment, if solid materials are formed, they can be removed by suitable means, e. g. filtration. It has been found that treatment as described above substantially reduces the bromine number of naphthenic acids originally having bromine number of for example at least 2. Any suitable method can be used to reduce the bromine number. For example, the bromine number of relatively concentrated acids can generally be reduced by removing unsaponifiable material, or by distilling to obtain a distillate having reduced bromine number.

In connection with the above bromine number and maximum boiling point specifications, it has been found that both specifications must be met if naphthenic acids are to be suitable for use in emulsion polymerization of butadiene-1,3 compounds. That is, neither specification is sufficient in itself to provide suitable naphthenic acids.

Naphthenic acids used according to the present invention should also have saponification value, expressed as saponification value of oil-free naphthenic acids, within the approximate range 160–300, indicating average molecular weights for the acids of about 190–350. Preferred saponification values are 175–250.

Naphthenic acids for use according to the present invention preferably, but not necessarily, are substantially free of constituents boiling below about 250° F. at 2 mm. Hg. Removal of constituents boiling below 250° F. at 2 mm. Hg from naphthenic acids, e. g. light naphthenic acids, can be effected by any suitable means, e. g. distillation, for separation of acids according to molecular weight. Such removal of low-boiling components improves the acids for use in emulsion polymerization, but is not essential to obtaining suitable acids for that purpose.

Naphthenic acids for use according to the present invention can be prepared either from lubricating oil naphthenic acids or from light naphthenic acids by steps including obtaining such acids or their soaps in relatively concentrated form, reducing the unsaponifiable material concentration to the above specified degree, and making whatever bromine number and/or boiling range adjustments are necessary to obtain the above specified bromine number and boiling range specifications. Naphthenic acids for use according to the invention can be a fraction from lubricating oil naphthenic acids, which may or may not also contain a minor proportion of light naphthenic acids or a fraction thereof; all the acids used are free from constituents boiling outside the required boiling point specifications.

The following examples illustrate the invention. In each of these examples, interpolymerizations of butadiene-1,3 and styrene were carried out in aqueous emulsion. The polymerization recipe consisted of 72 parts by weight butadiene, 28 parts styrene, 180 parts distilled water; 0.1 part cumene hydroperoxide as catalyst, 1.72 parts of an iron-pyrophosphate-sugar complex (0.14 part $$FeSO_4.7H_2O$$

0.3 part $K_4P_2O_7$, 1.28 parts cerelose) as catalyst activator, 0.16 part of a modifier known commercially as Sulfole B–8 comprising alkyl mercaptans containing about 15.6 weight percent sulfur, 0.5 part potassium chloride as anti-coagulant, 0.1 part of an auxiliary emulsifying agent known commercially as Daxad 11 comprising a condensation product of formaldehyde and naphthalene sulfonic acids, and as emulsifying agent 4.7 parts (dry basis) of potassium soaps of petroleum naphthenic acids having certain properties as specified in the respective examples, and prepared according to the procedures specified in the respective examples. The polymerizations were carried out at a closely controlled temperature of 41° F. The different polymerization recipes used differed from each other in the nature of the naphthenic acids whose potassium soaps were used as emulsifying agent. For each recipe, the time required to obtain 60% polymerization was determined by sampling the reaction mixture at intervals and determining the weight proportion of solid polymerization product in the sample; from such determinations a plot of percent polymerization against time was constructed, and the time required to obtain 60% polymerization determined by interpolation. The time required to obtain 60% polymerization with each recipe was compared with the time required to obtain 60% polymerization using a recipe identical except that the emulsifying agent therein was potassium soaps of disproportionated rosin acids, these soaps being known commercially as Dresinate 731. In most cases in the following examples, the value for time to obtain 60% polymerization relative to the corresponding time using rosin soaps is an average value obtained from several runs. The time required to obtain 60% polymerization using Dresinate 731 is generally in the neighborhood of 630 minutes.

*Example I*

Two polymerizations were carried out using in the two recipes potassium naphthenates differing from each other in the maximum boiling points of the naphthenic acids from which the naphthenates were made. The following table gives the properties of the naphthenic acids from which the two emulsifying agents were prepared, and the time, relative to that required using Dresinate 731 as emulsifier, required to obtain 60% polymerization. Positive time values indicate that the emulsifying agent gave 60% polymerization in that much less time than Dresinate 731, i. e. that it is that much faster than Dresinate 731. Negative time values indicate that the emulsifying agent is that much slower than Dresinate 731. The indicated boiling points were obtained from vapor temperature in a 1 mm. Hg vacuum distillation.

| No. | Acids Type | Saponification Value | Minimum Boiling Pt. | Maximum Boiling Pt. | Time in Minutes |
|---|---|---|---|---|---|
| 1 | Lub. Oil | 164 | 395 | 448 | 45 |
| 2 | do | 151 | 395 | 507 | −95 |

Samples No. 1 and 2 were prepared from crude petroleum by steps including crude distillation, saponification of the residue, vacuum distillation of the saponified residue, admixing the vacuum distillation residue with 25 percent aqueous isopropanol and with petroleum naphtha to obtain an extract comprising mainly petroleum naphtha and unsaponifiable material and a raffinate comprising mainly aqueous isopropanol and soaps of lubricating oil naphthenic acids, separating and acidifying the raffinate, separating lubricating oil naphthenic acids from the aqueous layer of the acidified raffinate, steam distilling the separated naphthenic acids to remove small amounts of naphtha, contacting the resulting product with propane to extract naphthenic acids therefrom, removing propane from the extract, saponifying the extract, removing residual unsaponifiable material from the saponified extract by extraction with petroleum naphtha, acidifying the raffinate to obtain lubricating oil naphthenic acids substantially free of unsaponifiable material, vacuum distilling the acids to obtain an initial −25 percent distillate, a 25–50 percent distillate, and a 50–75 percent distillate, and removing with naphtha unsaponifiable material formed during distillation. Sample No. 1 is the 25–50 percent distillate, and sample No. 2 is the 25–50 percent distillate and the 50–75 percent distillate combined in equal weight proportions.

Example I shows the effect of maximum boiling point of naphthenic acids upon naphthenate emulsifiers for emulsion polymerization, and the necessity, when it is desired to prepare a rapid emulsifying agent from lubricating oil naphthenic acids, of obtaining from such acids a lower molecular weight fraction containing substantially no constituents having normal boiling point above about 485° F. at 1 mm. Hg.

*Example II*

A series of five polymerizations was carried out using in the five recipes potassium naphthenates differing from each other in the saponification values of the naphthenic acids from which the naphthenates were made. The following table gives the properties of the naphthenic acids from which the five emulsifying agents were prepared, and the time, relative to that required using Dresinate 731 as emulsifier, required to obtain 60% polymerization.

| No. | Acids Type | Saponification Value | Bromine Number | Time in Minutes |
|---|---|---|---|---|
| 1 | Lub. oil | 146 | 3.5 | −75 |
| 2 | do | 164 | 4.6 | 45 |
| 3 | Gas oil | 222 | 1.2 | 200 |
| 4 | do | 246 | 0.8 | 185 |
| 5 | do | 266 | 0.8 | 70 |

Sample No. 2 is the same as sample No. 1 in Example I. Sample No. 1 in the present example was prepared from crude petroleum by a series of steps including distillation, saponification of the residue, vacuum distillation, contacting with isopropanol and naphtha, acidifying the raffinate, separating and steam distilling acids, extracting with propane, saponifying the extract, removing residual unsaponifiable material, and acidifying to obtain naphthenic acids, the above steps being the same as those used in preparing the samples in Example I, then reducing the bromine number of the acids by contacting 89 parts by volume of the latter with ten parts of 30 percent aqueous formaldehyde and one part of 1.84° Bé. sulfuric acid at 250–300° F., dissolving the contacted acids in naphtha, filtering solid materials from the solution, washing the filtered solution, and removing naphtha from the washed solution by distillation to obtain as residue sample No. 1.

Samples Nos. 3–5 were prepared from three different samples of light naphthenates having different saponification value from different petroleum sources by steps including obtaining light naphthenic acids in relatively concentrated form, saponifying the acids, extracting with petroleum naphtha to substantially completely remove unsaponifiable material, reducing the bromine number by treating according to the procedure described above, and distilling the acids to recover initial −90 percent distillate fractions for use as samples 3 and 5, and to recover an initial −95 percent distillate fraction for use as sample 4.

Example II shows the effect of saponification value of naphthenic acids on naphthenate emulsifiers for emulsion polymerization. This example shows the necessity, when a rapid emulsifying agent is desired, of using naphthenic acids having saponification value above about 160. This example also shows that there is an optimum saponification value in the neighborhood of 220, and that the polymerization speed begins to decrease as the saponification value increases above the optimum. Generally, the naphthenic acids used should have saponification value not greater than 300; otherwise, the soaps of the acids do not give polymerizations substantially faster than Dresinate 731.

*Example III*

Two polymerizations were carried out using in the two recipes potassium naphthenates differing from each other in the bromine numbers of the naphthenic acids from which the naphthenates were made. The following table gives the properties of the naphthenic acids from which the two emulsifying agents were prepared, and the time, relative to that required using Dresinate 731 as emulsifier, required to obtain 60% polymerization.

| No. | Type | Saponification Value | Bromine Number | Time in Minutes |
|---|---|---|---|---|
| 1 | Lub. oil | 197 | 5.9 | 60 |
| 2 | do | 195 | 2.6 | 160 |

Sample No. 1 is the initial −25% fraction obtained by vacuum distillation of lubricating oil naphthenic acids in Example I. Sample No. 2 was obtained from a similar initial −25% fraction by bromine number reduction according to the method as described in Example I.

Example III shows the effect of bromine number of naphthenic acids on naphthenate emulsifiers for emulsion polymerization. This example shows that a decrease in bromine number increases the rapidity of the polymerization, and that the bromine number should be about 6 or below in order to obtain a polymerization substantially more rapid than that given by Dresinate 731.

It is noted that bromine number and saponification value are inter-related to the extent that reduction of bromine number to below 6 produces a rapid emulsifying agent only when the saponification value is within the proper range 160–300. For in Example I it is seen that, with bromine numbers around 5, a polymerization faster than that given with Dresinate 731 is obtained only when the saponification value is above about 160.

*Example IV*

Two polymerizations were carried out using in the two recipes potassium soaps of petroleum naphthenic acids having in both cases saponification values of about 219 and bromine numbers of about 0.4, but differing from each other in that in one case (sample No. 1) the naphthenic acids were gas oil acids having a boiling range of about 251° F. to about 373° F., at about 1 mm. Hg, and in the other case (sample No. 2) the naphthenic acids were a 60–70% distillate fraction from such gas oil acids, that fraction having a boiling range of about 324° F. to about 335° F. at about 1 mm. Hg. It was found that 60% polymerization was obtained with the recipe containing soaps of the 60–70% distillate in about 285 minutes less time than that required using Dresinate 731, whereas the soaps of the wider boiling range gas oil acids were only about 216 minutes faster than Dresinate 731.

This example shows the advantage of using a relatively narrow boiling range fraction of naphthenic acids. Such narrow fractions can be obtained from either light naphthenic acids or from lubricating oil acids. It is believed that such fractions give particularly rapid polymerizations because they are essentially free of both high and low molecular weight naphthenic acids which do not give as rapid polymerizations.

Although, in the above examples, butadiene and styrene copolymers are used as examples of polymers of butadiene-1,3 compounds prepared by emulsion polymerization in the presence of naphthenates as herein specified, substantially similar results may be obtained when copolymers of butadiene and acrylic acid nitrile, or of butadiene and methyl methacrylate, or of isoprene and styrene, or polymers of butadiene, chloroprene, or isoprene are prepared by emulsion polymerization, or when other polymerizations of butadiene-1,3 compounds are conducted, in the presence of such naphthenates. Furthermore, although cumene hydroperoxide is used in the above examples as an example of a polymerization catalyst, other catalysts can be used, e. g., potassium persulfate, tertiary butyl hydroperoxide, benzoyl peroxide, etc. Emulsifying agents according to the invention can be used in conjunction with any known polymerization initiator, or other polymerization aid.

According to the present invention, emulsion polymerizations of butadiene-1,3 compounds are conducted in the presence of alkali metal soaps of petroleum naphthenic acids as previously specified. Such soaps are prepared by neutralization of the acids with an alkali metal basic compound, e. g., hydroxides, carbonates, etc. of sodium, potassium, etc. Potassium soaps give generally excellent results, but substantially similar results are obtained when other metal alkali soaps, e. g., sodium soaps, are used in their place in polymerization above about 32° F.

The concentration of naphthenate emulsifying agent in the polymerization recipe varies according to the polymerization speed that is desired. Since naphthenates used according to the invention generally result in faster polymerizations than previously used emulsifying agents, relatively small concentrations of naphthenates generally give as good results as relatively large concentrations of other emulsifying agents. For example, when using 180 parts by weight of water, 2.5–3.5 parts by weight of naphthenates having oil content below 10%, maximum boiling point not greater than about 485° F. at 1 mm. Hg, saponification value 175–250, and bromine number 0.3–2.0 generally give polymerization about as rapid as that obtained with 4.7 parts of Dresinate 731. When more than 3.5 parts of naphthenates are used, still faster polymerizations are obtained; as much as 8 parts of naphthenates can be used advantageously if particularly rapid polymerizations are desired. It is generally preferred that at least one part of naphthenates be used per 180 parts of water.

The temperature at which polymerization according to the present invention is conducted can be any temperature, at or above about 32° F., which is known for emulsion polymerizations. Thus, the temperature can be within the range from about 32° F. to about 150° F., but preferably within the range from about 32° F. to about 90° F., because naphthenate emulsifying agents according to the invention have been found to be particularly excellent in performance at such temperatures.

Temperatures below 32° F. are not within the scope of the present invention, since they involve the use of polymerization recipes containing antifreeze compounds.

Emulsion polymerization of butadiene-1,3 compounds at temperatures below about 32° F. in the presence of a polymerization-supporting amount of potassium soaps of petroleum naphthenic acids is disclosed and claimed in copending application of James S. Sweely, Serial No. 194,193, filed November 4, 1950.

I claim:

1. The process which comprises polymerizing, at a temperature of at least about 32° F., a butadiene-1,3 compound in aqueous emulsion in the presence of an emulsifying agent comprising alkali metal soaps of a mixture of petroleum naphthenic acids containing less than about 10 percent unsaponifiable material, said mixture containing all of the naphthenic acids whose soaps are in said aqueous emulsion, said mixture having bromine number less than about 6 and saponification number on an oil-free basis within the approximate range from 160 to 300 mg. of KOH per gram and being substantially free from components boiling above about 485° F. at 1 mm. Hg, and at least a major proportion of said mixture having been prepared by removing naphthenic acid components boiling above about 485° F. at 1 mm. Hg from lubricating oil naphthenic acid mixtures containing substantial amounts of such naphthenic acid components.

2. Process according to claim 1 wherein said naphthenic acids are substantially free from components boiling below about 250° F. at 2 mm. Hg.

3. Process according to claim 1 wherein said naphthenic acids have bromine number of about 0.3–2.0.

4. Process according to claim 1 wherein said naphthenic acids have been previously treated for reduction of bromine number.

5. Process according to claim 1 wherein butadiene-1,3 is interpolymerized with styrene.

6. Process according to claim 1 wherein said alkali metal soaps are potassium soaps.

7. Process according to claim 1 wherein said alkali metal soaps are sodium soaps.

8. The process which comprises interpolymerizing at about 40° F. butadiene-1,3 and styrene in aqueous emulsion in the presence of alpha, alpha-dimethyl benzyl hydroperoxide as catalyst and in the presence of an emulsifying agent comprising alkali metal soaps of a mixture of petroleum naphthenic acids containing less than about 10 percent unsaponifiable material, said mixture containing all of the naphthenic acids whose soaps are in said aqueous emulsion, said mixture having bromine number within the approximate range from 0.3 to 2.0 and saponification number on the oil-free basis within the approximate range from 175 to 250 mg. of KOH per gram and being substantially free from components boiling above about 485° F. at 1 mm. Hg, and a major proportion of said mixture having been prepared by removing naphthenic acid components boiling above about 485° F. at 1 mm. Hg from lubricating oil naphthenic acid mixtures containing substantial amounts of such naphthenic acid components.

JAMES S. SWEELY.

References Cited in the file of this patent

Starkweather et al.: Ind. & Eng. Chem., vol. 39, No. 2, February 1947, page 211.

Vandenberg et al.: Ind. & Eng. Chem., vol. 40 No. 5, May 1948, pp. 932–937.